United States Patent [19]

Fehler et al.

[11] 4,062,182
[45] Dec. 13, 1977

[54] COMBUSTION CHAMBER FOR GAS TURBINE ENGINES

[75] Inventors: Adolf Fehler, Pfaffing; Gunter Kirschey, Munich, both of Germany

[73] Assignee: MTU Motoren-und Turbinen-Union, Munich, Germany

[21] Appl. No.: 641,086

[22] Filed: Dec. 15, 1975

[30] Foreign Application Priority Data

Dec. 21, 1974 Germany .............................. 2460740

[51] Int. Cl.² .............................................. F02C 7/22
[52] U.S. Cl. .................................. 60/39.65; 60/39.71; 60/39.74 R; 60/DIG. 11
[58] Field of Search ........ 60/39.65, 39.74 R, 39.74 B, 60/39.71, DIG. 11

[56] References Cited

U.S. PATENT DOCUMENTS

| 2,931,174 | 4/1960 | Allen .................................... 60/39.71 |
| 2,959,006 | 11/1960 | Ferrie ................................. 60/39.74 R |
| 3,048,014 | 8/1962 | Schmidt ........................... 60/39.74 R |
| 3,055,179 | 9/1962 | Lefebvre et al. .................... 60/39.71 |
| 3,729,285 | 4/1973 | Schwedersky ................ 60/DIG. 11 |
| 3,811,277 | 5/1974 | Markowski ........................ 60/39.65 |
| 3,820,324 | 6/1974 | Grindley et al. .................... 60/39.71 |
| 3,925,002 | 12/1975 | Verdouw .............................. 60/39.71 |
| 3,934,409 | 1/1976 | Quillevere et al. ................. 60/39.71 |
| 3,946,553 | 3/1976 | Roberts et al. ................. 60/39.74 R |

OTHER PUBLICATIONS

Kappler, G. et al., "Experimental Investigation of a New Concept of Fuel Prevaporization", Journal of Engineering for Power, Mar. 2-6, 1975, pp. 305-308.

*Primary Examiner*—Carlton R. Croyle
*Assistant Examiner*—Robert E. Garrett

[57] ABSTRACT

A combustion engine for gas turbine engines, constituted of an outer housing and having at least one flame tube inserted therein which is suppliable with secondary or mixing air through the intermediary of an annular passageway formed between the outer housing and the flame tube while, on the other side, the primary zone within the flame tube has fuel-enriched combustion air conveyable thereto, and wherein there are provided at least two fuel atomizer nozzles which are controllable independently of each other.

4 Claims, 1 Drawing Figure

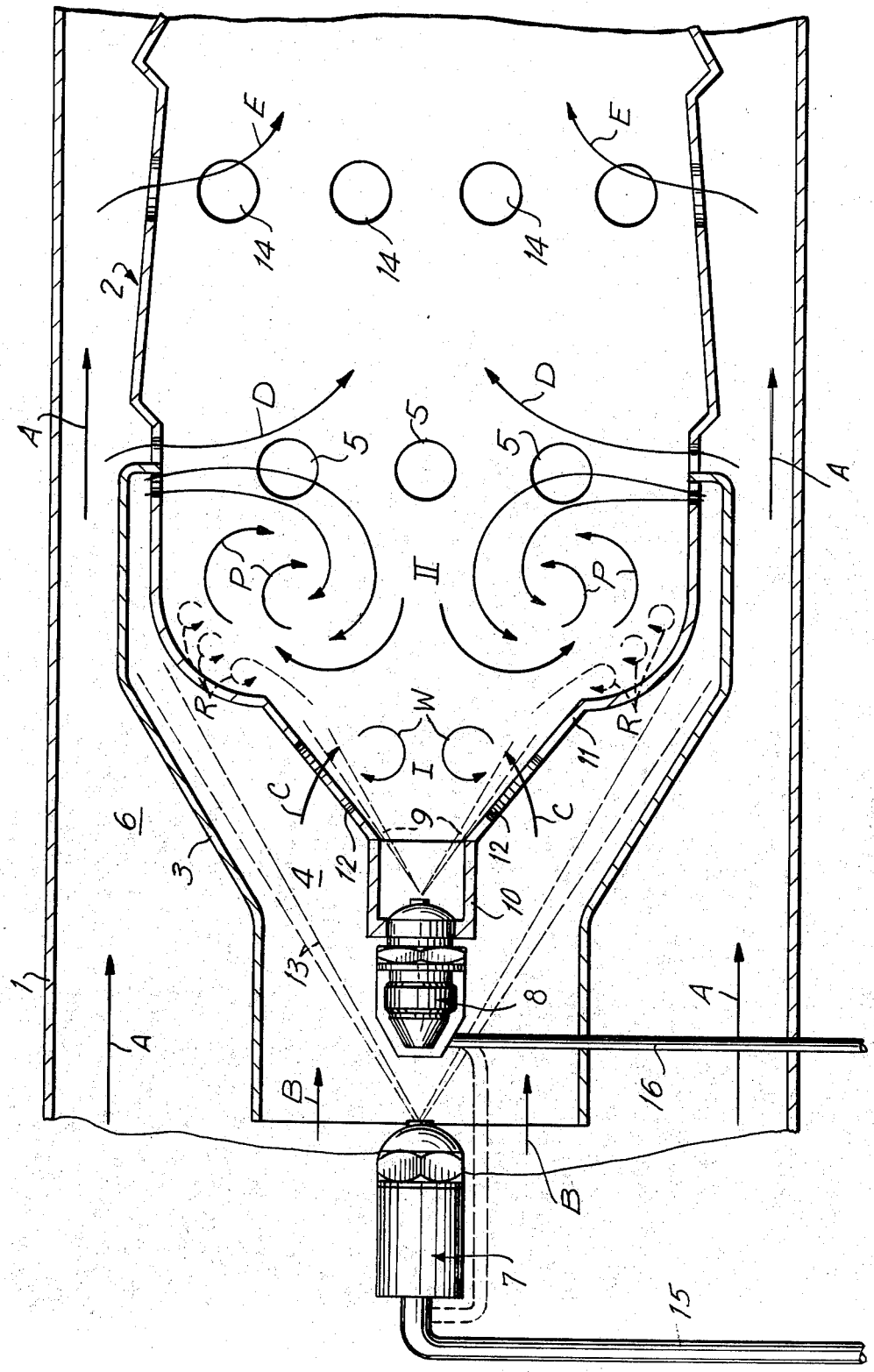

4,062,182

COMBUSTION CHAMBER FOR GAS TURBINE ENGINES

Field of the Invention

The present invention relates to a combustion chamber for gas turbine engines, constituted of an outer housing and having at least one flame tube inserted therein which is suppliable with secondary or mixing air through the intermediary of an annular passageway formed between the outer housing and the flame tube while, on the other side, the primary zone within the flame tube has fuel-enriched combustion air conveyable thereto, and wherein there are provided at least two fuel atomizer nozzles which are controllable independently of each other.

DISCUSSION OF THE PRIOR ART

In known embodiments of combustion chambers for gas turbine engines, the fuel is, for example, finely atomized under high pressure through known Simplex-and-Duplex nozzles and is injected into the primary zone where it comes processed, meaning in a vaporized condition so as to be finally burned or it reaches the primary zone by means of air atomizers, wherein air is admixed with the fuel mostly already within the atomizer nozzle so to expedite or shorten the preparing process.

Also known is the fuel infeed and its preparation by means of different types of so-called "vaporizer-burners" in which the fuel reaches a gaseous state because of the high wall temperature caused by the combustion process and the flow relationship within the burner, and is premixed with air.

The mentioned fuel injection and preparation systems have the disadvantage, amongst others, that the combustion emanates more or less from one point and that, as a result, a uniform outlet temperature profile is attainable only through possible forced mixing sequences by means of a considerable constructional demand.

Furthermore, this type of point-like fuel injection, respectively, the presence of vaporiser units extending deeply into the combustion zone, relatively lengthy constructed combustion chambers, in order to attain spatially uniform fuel conditioning or preparation and thereby a combustion, or thereby requires an unduly pronounced swirling of fuel and air components in the primary zone so as to already force in the primary zone a relatively uniform combustion with the further result in an increased pressure and consequent loss of power.

Furthermore, with conventional combustion chambers, combustion occurs in the combustion zone at an approximately stoichiometric fuel/air mixture. The relatively high fuel content in this mixture, especially as a fuel droplet-air mixture, as well as the relatively high combustion temperatures of about 1,800° to 2,000 °C are, amongst others, further causes in the formation of deleterious materials such as nitrogen oxide ($NO_x$), unburned hydrocarbons ($C_xH_y$), carbon monoxide (CO), as well as of smoke.

It has been ascertained through practical tests that a lower combustion temperature of possibly no more than 1,400 °C or slightly higher leads to an appreciable reduction in pollutant or deleterious material emissions.

In particular the formation of nitrogen oxide is dependent upon the time in which there is present the gases containing the nitrogen and oxygen and upon the combustion temperature so that, in other words, relatively high combustion temperatures and a relatively extended retention time at the mentioned relatively high combustion temperatures (1,800° to 2,000 °C) will lead to a relatively extensive formation of nitrogen oxide.

With a view towards effecting a reduction in pollutant emissions, in particular with regard to the proportionally relatively strongly occurring nitrogen oxide formation, preference should thus be given in a first instance, to a more accurate controllability over combustion temperature, insofar as technological measures for the controllability, respectively reduction of the dwelling time of the fuel-air mixture with respect to precision, can be barely technically realized or only with extremely complex installations.

For the purpose of achieving the lowest possible pollutant emissions in a combustion chamber for gas turbine engines, there must, amongst others, be met the following basic criteria:

lower combustion temperatures which should not significantly exceed a value of about 1,400 °C;

avoidance of a fuel-air mixture containing fuel droplets, in which the fuel can be conveyed to the primary or respectively combustion zone in a pre-vaporized state;

possibly complete fuel air admixture, and namely prior to its entry into the primary zone, so as to achieve a homogenous combustion.

However, in actual practice, it affords considerable difficulties to producing a combustion chamber which will fulfill the requirements mentioned in detail hereinabove since, on the one hand, there is to be considered an optimum combustion requiring a stoichiometrically satisfactory fuel-air mixture and the therewith connected relatively high combustion temperatures and, on the other hand, for combustion chambers of gas turbine engines the need for fuel-air mixture zones having a rich fuel content with regard to good ignition, the engine starting cycle, as well as with respect to the lean mixture stalling limit.

The required air excess of the fuel-air mixture required in the primary zone in order to prevent the relatively high combustion temperatures and, consequently, to reduce the deleterious exhaust gas emissions, would again not be reconcilable with the previously mentioned requirements (stoichiometric fuel-air mixture).

SUMMARY OF THE INVENTION

Accordingly, within the framework of the above-mentioned problem, the present invention provides a combustion chamber for gas turbine engines, respectively, gas turbine jet engines, in which primarily the previously mentioned deleterious exhaust gas constituents are largely avoided.

Commencing from a combustion chamber for a gas turbine engine pursuant to the previously mentioned construction, the invention is defined by the combination of the following features:

a. presently, two mutually independently controllable fuel atomizer nozzles are successively arranged in an axial direction in such a manner that within the flame tube, sequentially following in the direction of the main flow, there is formed for the entire combustion a combustion zone which is rich in fuel, as well as a combustion zone which is leaner in fuel;

b. an air supply hood is provided which encompasses the fuel atomizer nozzles, as well as the upstream portion of the flame tube, and whose combustion air passageway formed between the external housing and the flame tube lies in communication with the first and second combustion zones through special apertures formed in the flame tube;

c. the fuel spray or jet cone of a first one of respectively two sequential actuated fuel atomizer nozzles is located within the combustion air passageway and extends approximately parallel to a funnel-shaped widening wall section of the air infeed hood, while the spray or jet cone of the presently subsequent other atomizer nozzle extends approximately parallel to the inner wall of a flame tube section which widens in a funnel-shape from the last-mentioned atomizer nozzle and which concurrently provides the flame tube volume needed for the first combustion zone upstream of the second combustion zone (main combustion zone).

Through the intermediary of the two mutually independently controlled fuel atomizer nozzles, connected in sequence in an axial direction, it is possible to prepare in the first combustion zone the fuel enriched stoichiometric fuel-air mixture required for the current operating range, and in the second combustion zone, also referred to as "main recirculation zone" with the leaner fuel-containing, air enriched fuel-air mixture for the current operating range which affords the desired relatively low combustion temperature.

Both combustion zones are so correlatable with respect to each other, whereby the hot gas temperatures required for low-pollutant combustion will not be exceeded.

Another important advantage of the invention consists of in that, without the necessary constructions in the flame tubes of conventional combustion chamber concepts there is facilitated a relatively high fuel vaporization rate of the fuel, respectively, a desired intensive gaseous preparation of the fuel-air mixture already before its entry into the main recirculation zone, whereby the volume of the flame tube can be maintained relatively small notwithstanding the two combustion zones being arranged in sequence along an axial direction.

In a further aspect of this invention, the apertures associated with the first combustion zone in the funnel-shaped section of the flame tube, may be constructed as helical or twisted slots.

Hereby, the significant fuel which is fed into the first combustion zone, which is sprayed out of the therewith associated fuel atomizer nozzles essentially along the inner wall of the mentioned flame tube section, is immediately rotationally atomized with the air which is tangentially blown in through the helical slots.

BRIEF DESCRIPTION OF THE DRAWING

Further objects and advantages of the present invention will now become more readily apparent from the following detailed description, in conjunction with the accompanying single FIGURE of the drawing which is a sectional view taken along the horizontal centerline illustrative of a combustion chamber assembled in accordance with the present invention.

DETAILED DESCRIPTION

The combustion chamber shown in the drawing consists of an outer casing or housing 1 having a flame tube 2 inserted therein. At its upstream end the combustion chamber includes an air infeed hood 3 arranged within the outer housing 1; and which encompasses the flame tube 2 at its upstream end so as to, in this manner, form a gas conveying passageway 4 sealed against the mixing air (arrows A). With its downstream end, which is bent inwardly towards the flame tube, the air infeed hood 3 so engages the flame tube 2 that apertures 5 formed in the flame tube 2 each have one-half establishing a communication between the gas passageway 4 and the interior of the flame tube and, on the other side, each half forms a connection between the flame tube interior and the secondary mixing air passageway 6.

Combustion air is admitted into the gas passageway 4 in the direction of the arrows B. Secondary air (arrows A), as well as combustion air (arrows B) are conveyed from a compressor (not shown) of a gas turbine engine to the combustion chamber.

At least two fuel atomizer nozzles 7, 8 which are arranged in sequence in an axial direction are provided in the combustion chamber.

One of these two fuel atomizer nozzles 8 is directly connected, by means of an annular ring sleeve 10, to a section 11 of the flame tube which widens conically towards the upstream end thereof.

Thus, the space within the flame tube 2 which is encompassed by this flame tube section 11 constitutes the combustion zone I, in which there is to be prepared a stoichiometric fuel-air mixture, with its resultant relatively high combustion temperatures.

The fuel spray or jet cone 9 of the fuel atomizer nozzle 8 extends approximately parallel to the inner wall of the concically-shaped section 11 of the flame tube, and mixes hereby intimately with the combustion air (arrows C) blown in tangentially under swirl from the gas passageway 4 through helical slots 12 in the flame tube section 11.

The hereby generated rotational swirl of the fuel-air mixture into combustion zone I is indicated by the arrows W.

The fuel spray cone 13 which is associated with the other fuel atomizer nozzle 7 lies within the gas passageway 4 and hereby extends approximately parallel to the conically widening wall section of the air infeed hood 3. The fuel supplied by means of the atomizer nozzle 7 hereby mixes intimately with portions of the combustion air supplied along the direction of the arrows B so that, as a result of temperature radiation in the region of the flame tube 2 which is encompassed by the air infeed hood 3, there is obtained a prevaporization of the gas mixture even before the latter enters the flame tube 2, so that there can be prepared a most extensively droplet-free fuel-air mixture for the combustion process respective in the combustion zone II, and the main combustion zone.

Due to the fuel-air jets which are directed at a relatively high velocity through the respective halves of aperture 5 and against each other, there is produced a recirculatory swirling motion P which is needed for the flame stabilization in the combustion zone II, so as to cause an optimum homogeneous distribution of the fuel-air mixture.

The hot gas vortices R issuing from the combustion zone I at the downstream end of the conically-shaped flame tube section 11, are a considerable aid in stabilizing the air-enriched combustion in combustion zone II which is required for a low-pollutant combustion.

The represented infeed and preparation of the fuel-air mixture for combustion zone II under the utilization of the hot gas vortices R leads, amongst other things, to a spatially short and uniform combustion in combustion zone II.

Through the intermediary of the cross-sectional halves of apertures 5 presently kept free by the air infeed hood 3, a portion of the secondary air admitted from the secondary air passageway 6 conveyed in the direction of the arrows D can be blown against the middle of the flame tube so as to equalize the temperature profile over the entire cross-section of the flame tube.

From secondary air passageway 6, further secondary air may be directed into flame tube 2 in the direction of arrows E through apertures 14 in order to reduce the combustion chamber discharge temperature to some extent or to attain, together with the aforementioned secondary air portions (arrow D), an equalization of the temperature profile at the combustion chamber outlet.

The invention facilitates a two-zone combustion with two mutually independently controllable combustion systems in a single flame tube.

It is here of particular importance that the at least two fuel atomizer nozzles 7, 8 are controllable separately from each other and that both combustion systems are then determinable with respect of one to the other such as to allow for the relatively low combustion temperature level needed in combustion zone II for a low-pollutant combustion.

As can be ascertained from the drawing, fuel is supplied separately to the fuel atomizer nozzles 7, 8 by means of the supply conduits 15, 16.

On the other hand, however, it is feasible, for example, to supply fuel to the fuel atomizer nozzle 8 through the conduit 17 shown in phantom line from the supply conduit 15, namely, on the basis of a combined fuel supply to the two atomizer nozzles 7, 8 which would from thereon be able to consider the requirements of a desired differentiated fuel quantity injection.

The invention is also suited to other types of combustion chambers, for example, such as combined ring-tube combustion chambers in which the combustion chamber outer housing extends coaxially to the longitudinal axis of a gas turbine engine, and in which within the outer housing there are arranged several equally spaced flame tubes.

Furthermore, the invention can also be used with purely ring or annular combustion chambers, where the air infeed hood and the flame tube would similarly be arranged annularly and coaxially to the longitudinal axis of the engine.

In the latter instance a larger number of series-connected pairs of atomizer nozzles would be arranged at equal spacings coaxially to the longitudinal axis of the engine.

While there has been shown what is considered to be the preferred embodiment of the invention, it will be obvious that modifications may be made which come within the scope of the disclosure of the specification.

What is claimed is:

1. In a combustion chamber for gas turbine engines, including an outer housing; at least one flame tube inserted in said housing so as to form an annulus between the outer housing and the flame tube; means for supplying secondary air into said annulus; and means for supplying a primary zone inside the flame tube with fuel-enriched combustion air; an improvement comprising:
   a. two independent fuel atomizer nozzles with respective mutually independently controllable fuel supplies in axial series arrangement within said flame tube so that combustion takes place entirely initially in a fuel-enriched combustion zone and thereafter in a second main combustion zone provided with a leaner amount of fuel in that sequence within the flame tube;
   b. an air infeed hood encompassing said fuel atomizer nozzles and the upstream end of said flame tube so as to form a combustion air passageway between said hood and the flame tube, said passageway communicating with the first and second combustion zones respectively through first helical apertures and second further apertures formed in said flame tube;
   c. said air infeed hood having a conically widening section, the fuel spray cone of the first of said two fuel atomizer nozzles extending within said combustion air passageway approximately parallel with said conically widening section of the air infeed hood, the spray cone of the second atomizer nozzle extending approximately parallel to the inner wall of a section of said flame tube which conically widens from the second atomizer nozzle so as to form the required space in the flame tube for the first combustion zone preceding the second main combustion zone, a cylindrical sleeve surrounding said second nozzle and connected to said conically widening section of the air infeed hood;
   d. said conically widening section of said air infeed hood having a smaller cone angle than said section of the flame tube such that said passageway narrows in a direction away from said second atomizer nozzle;
   e. said conical section of said air infeed hood having an end remote from said second atomizer and including a cylindrical portion extending from said end coaxially with said combustion zones and a radial portion on said cylindrical portion extending into said further apertures in said flame tube to divide these apertures into a first part communicating with the combustion air passageway between the flame tube and said hood and a second part communicating with the annulus between the flame tube and the housing such that secondary combustion products in said combustion air passageway which have passed said helical apertures are constrained to pass through said first part of said further apertures into said second combustion zone, while secondary air flowing in said annulus passes through said second part of said further apertures into said flame tube, said flame tube including a radial enlargement at the end of the conically widening section of the flame tube remote from the second atomizer nozzle.

2. The combustion chamber as claimed in claim 1 wherein said flame tube includes a cylindrical portion merging with said radial enlargement, said further apertures being in said cylindrical portion.

3. The combustion chamber as claimed in claim 2 wherein said radial enlargement is rotationally symmetrical about the axis of the combustion zones.

4. The combustion chamber as claimed in claim 3 wherein said flame tube has additional apertures located downstream of the combustion zones.

* * * * *